US006848868B2

United States Patent
Kasperik

(10) Patent No.: US 6,848,868 B2
(45) Date of Patent: Feb. 1, 2005

(54) MULTIPLE GROOVE CHIP CONTROL FOR CUTTING INSERT

(75) Inventor: James R. Kasperik, Latrobe, PA (US)

(73) Assignee: Kennametal Inc., Latrobe, PA (US)

( * ) Notice: Subject to any disclaimer, the term of this patent is extended or adjusted under 35 U.S.C. 154(b) by 101 days.

(21) Appl. No.: 09/840,536

(22) Filed: Apr. 23, 2001

(65) Prior Publication Data

US 2002/0154958 A1 Oct. 24, 2002

(51) Int. Cl.$^7$ ............................. B23B 27/22; B23P 15/28
(52) U.S. Cl. ....................................... 407/114; 407/115
(58) Field of Search ............................... 407/114, 115, 407/116, 118, 119, 120

(56) References Cited

U.S. PATENT DOCUMENTS

| | | | | |
|---|---|---|---|---|
| 3,381,349 A | * | 5/1968 | Newcomer | 407/114 X |
| 3,786,541 A | | 1/1974 | Lundgren | 29/95 R |
| 3,885,281 A | | 5/1975 | Stambler | 29/95 R |
| 3,947,937 A | | 4/1976 | Hertel | 29/95 R |
| 4,087,193 A | * | 5/1978 | Mundy | 407/114 |
| 4,367,990 A | | 1/1983 | Porat et al. | 407/114 |
| 4,681,487 A | | 7/1987 | Pettersson | 407/114 |
| 5,122,017 A | * | 6/1992 | Niebauer | 407/114 |
| 5,934,844 A | | 8/1999 | Woolley | 407/114 |
| 6,065,907 A | | 5/2000 | Ghosh et al. | 407/114 |

FOREIGN PATENT DOCUMENTS

GB      2035859      *   6/1980

* cited by examiner

Primary Examiner—Henry W. H. Tsai
(74) Attorney, Agent, or Firm—Larry R. Meenan

(57) ABSTRACT

A cutting insert having an upper and a lower base face; side walls adjoining the faces; at least one cutting edge formed at an intersection of the upper face and a side wall; and at least one cutting corner formed at an intersection of an adjacent pair of side walls. A chip control structure is formed in the upper face extending along the cutting edge from the cutting corner for at least an effective cutting length of the cutting edge. A land surface spaces the chip control structure from the cutting edge. The chip control structure includes multiple radially spaced grooves, wherein the grooves of the chip control structure have a depth generally decreasing from the land toward the center of the insert.

20 Claims, 2 Drawing Sheets

MULTIPLE GROOVE CHIP CONTROL FOR CUTTING INSERT

BACKGROUND OF THE INVENTION

1. Field of the Invention

The present invention relates to a cutting insert including multiple grooves for chip control. More particularly, the present invention is directed to a cutting insert including multiple grooves for chip control which is effective over a broad range of operational conditions namely, a wide range of materials cutting depths and feed rates.

2. Description of the Related Art

Cutting inserts are well known and a large percentage of them are of the throw away design. Such inserts are detachably clamped on a toolholder and then are discarded when they become dull or chipped. Throw away inserts are usually indexable and/or invertable so that an insert can be provided with at least two cutting edges for selective presentation to the cutting position. An indexable and/or invertable insert having multiple cutting edges is more economical because when one edge has been used, the insert may simply be indexed or inverted to the next usable edge. Such a feature is especially important when considering the high cost of materials from which inserts are produced.

In general, inserts must be securely and accurately held in place within a toolholder during the cutting operation. This is especially true when the inserts are deployed with numerically controlled machines which depend for accuracy upon an accurately located and firmly supported insert. When the inserts are large enough, it is possible to secure the insert both accurately and firmly within the pocket of a toolholder by providing the insert with a central hole and the toolholder with a pin-type clamping device. In other cases, such inserts may be held in place by a top clamp of a design well known in the art.

The main object of metal machining is the shaping of a new work surface. Much attention is paid to the formation of the chip during the machining process, even though the chip is a waste product, because the consumption of energy occurs mainly in the formation and movement of the chip. Thus an essential feature of any metalcutting operation is effective chip control. A principal class of chips is the discontinuous chip which has the practical advantage of being easily cleared from the cutting area. While some metals and alloys generate discontinuous chips during cutting operations, many do not. It is therefore very desirable to produce discontinuous chips during a cutting operation, regardless of the workpiece material and the machining conditions.

Because chip control is an important consideration in metal cutting operations, it has been a long standing objective in the art of metal cutting to develop improved chip control surfaces for use with cutting inserts. The present invention is directed to a cutting insert which is effective over a broad range of operational conditions namely a wide range of materials cutting depths and feed rates.

SUMMARY OF THE INVENTION

Briefly, according to the present invention there is provided a cutting insert having an upper and a lower base face; side walls adjoining the faces; at least one cutting edge formed at an intersection of the upper face and a side wall; and at least one cutting corner formed at an intersection of an adjacent pair of side walls. A chip control structure is formed in the upper face extending along the cutting edge from the cutting corner for at least an effective cutting length of the cutting edge. A land surface spaces the chip control structure from the cutting edge. The chip control structure includes multiple radially spaced grooves, wherein the grooves of the chip control structure have a depth generally decreasing from the land toward the center of the insert.

BRIEF DESCRIPTION OF THE DRAWINGS

Further features of this invention as well as the advantages derived therefrom will become clear from the following detailed description made with reference to the drawings in which.

DESCRIPTION OF THE PREFERRED EMBODIMENTS

Figure 1:
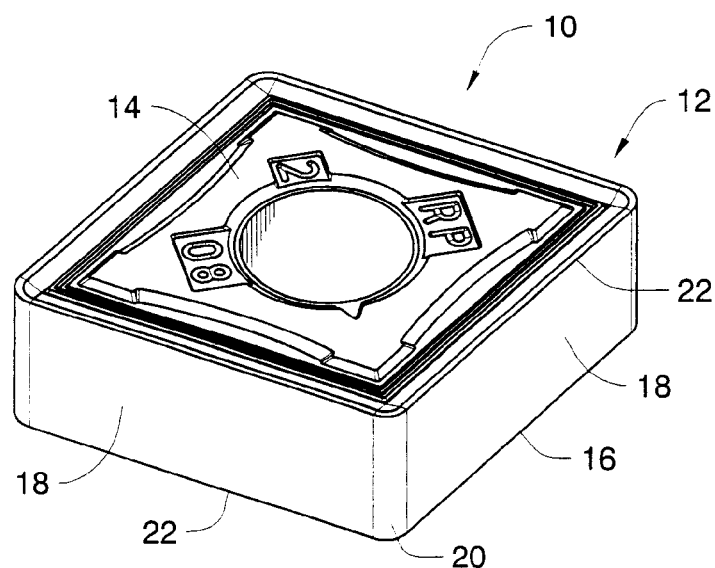
FIG. 1 is a perspective view of a cutting insert in accordance with the present invention.

In the following description, like reference characters designate like or corresponding parts. Also in the following description, it is to be understood that such terms as "downwardly", "upwardly", "inwardly", and the like, are words of convenience and are not to be construed as limiting terms apart from the invention as claimed.

Referring to the drawings there is a shown a cutting insert 10 in accordance with the present invention. The cutting insert 10 is of a regular rhombic shape and is formed of a hard material of a type well know in the art, such as a cemented tungsten carbide material or cermet. It will be appreciated that although the insert 10 is shown as a diamond shape, the cutting insert may be of most any desired shape including square shape and triangular shape but having chip control structures 12 essentially similar to those described more fully below.

The insert 10 has an upper face 14 and a substantially planar base face 16 with side walls 18 perpendicular to and joining the faces 14 and 16. For the specific embodiment shown in the figures, a central pin receiving hole 12 is provided through the insert 10 for retention of the insert within a tool holder (not shown). Curved cutting corners 20 are respectively at the intersections of the side walls 18 whilst cutting edges 22 are respectively formed at the intersections of each side wall 18 and upper face 14.

In a preferred embodiment, it should be noted that the cutting insert 10 shown throughout the figures is an indexable insert and therefore the detailed features described in conjunction with one cutting edge region of the insert are present within at least an effective cutting length of the cutting edge of the other cutting edge regions. Therefore, only the cutting edge region 24 shown in FIG. 4 and those insert portions directly related to this cutting edge region will hereafter be discussed in detail.

Figure 2:
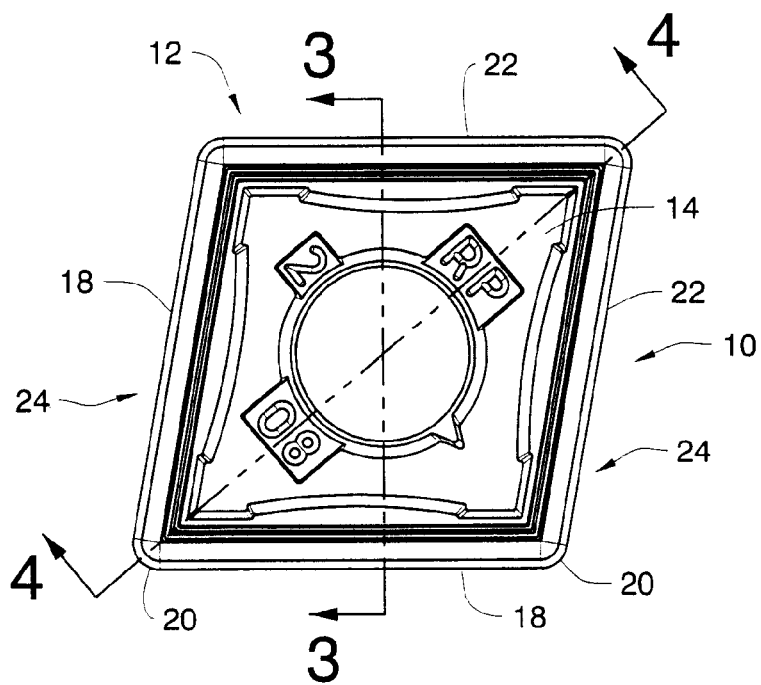
FIG. 2 is a top view of the insert of FIG. 1.

As shown in FIGS. 1 and 2, the chip control structure 12 in accordance with the present invention is formed in the upper face 14 and extends continuously along the cutting edges 22 and is spaced from the cutting edges by a land surface 26. The chip control structure 12 is formed of multiple radially spaced grooves 36a, 36b, 36c defined by floor regions 28a, 28b and 28c and deflector surfaces 30a, 30b and 30c, respectively.

Figure 3:
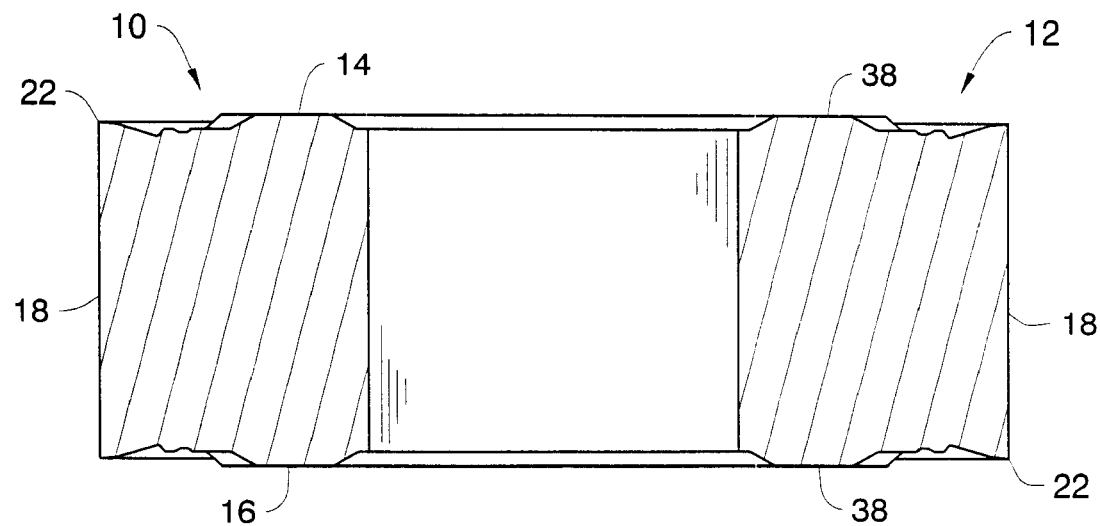
FIG. 3 is a cross sectional view of the insert of FIG. 2 taken along line 3—3.
Figure 4:
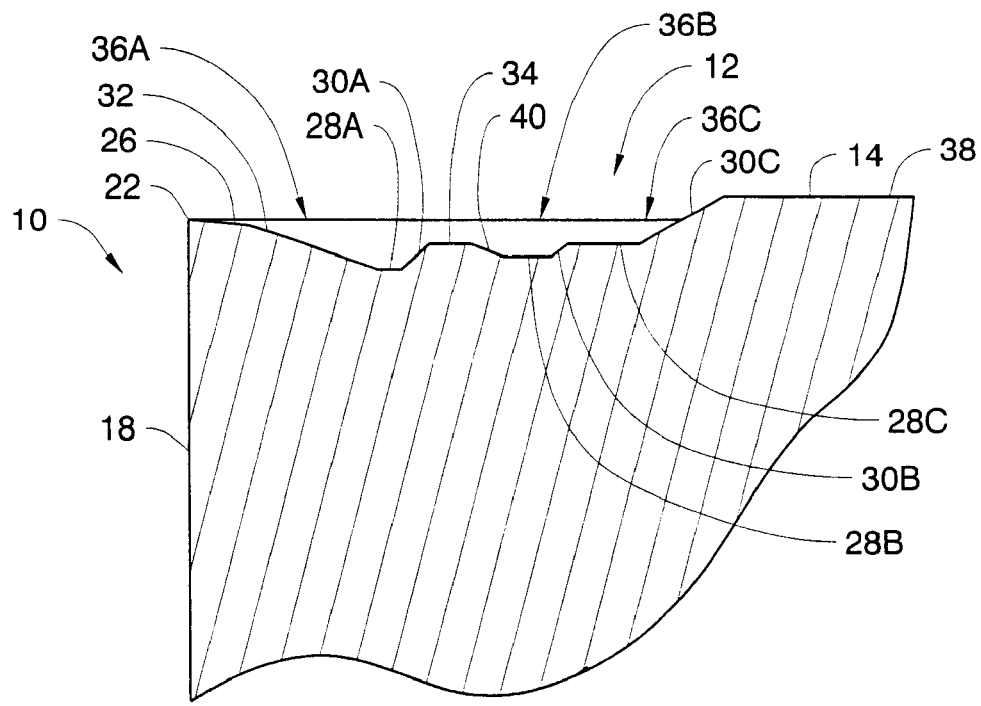
FIG. 4 is an enlarged partial cross sectional view of the insert of FIG. 2 taken along line 4—4.

Referring to FIGS. 3 and 4, the contour of the chip control structure 12 is more fully shown. The chip control structure 12 extends from the inner edge of the land surface 26 to a first descending surface 32. The first descending surface 32 extends downwardly towards the base face 16 and inwardly toward the center of the insert to a first floor region 28a. The descending surface 32 slopes downwardly from its associated land surface 26 towards the base face 16 at an angle of approximately 18 degrees. In one example, the angle of slope varies from about 10 degree to about 20 degree.

From the first floor region 28a the chip control structure 12 ascends upwardly toward the upper face 14 and inwardly toward the center of the insert 10 along a first chip deflector surface 30a to a first island 34. The first chip deflector surface 30a slopes upwardly towards the upper face 14 at an angle of approximately 40 degrees. In one example, the angle of slope varies from about 35 degree to about 45 degree. The first island 34 is a generally horizontal surface and is at a depth lower than the depth of the land surface 26. The first floor region 28a and the first chip deflector 30a cooperatively define a first groove 36a of the chip control structure 12.

As used herein, the depth is determined with reference to an imaginary plane formed by the peripheral edge of the land surface 26 and the center island 38 of the cutting insert 10.

The chip control structure 12 extends from the first island 34 downwardly toward the base face 16 and inwardly toward the center of the insert along a second descending surface 40 to a second floor region 28b. The descending surface 40 slopes downwardly towards the base face 16 at an angle of approximately 18 degrees. In one example, the angle of slope varies from about 10 degree to about 20 degree. The second floor region 28b is a generally horizontally extending surface. The depth of the first floor region 28a is greater than the depth of the second floor region 28b.

The chip control structure 12 extends from the second floor region 28b upwardly toward the upper face 14 and inwardly toward the center of the insert along a second chip deflector surface 30b to a third floor region 28c. The second chip deflector surface 30b slopes upwardly towards the upper face 14 at an angle of approximately 35 degrees. In one example, the angle of slope varies from about 30 degree to about 40 degree. The second chip deflector surface 30b and the second floor region 28b cooperatively define a second groove 36b of the chip control structure 12. The third floor region 28c is a generally horizontally extending surface and is generally of the same depth as the first island 34.

From the third floor region 28c, the chip control structure 12 extends along a third chip deflector surface 30c upwardly toward the upper face 14 and inwardly toward the center of the insert. The third chip deflector 30c surface slopes upwardly towards the upper face 14 at an angle of approximately 30 degrees. In one example, the angle of slope varies from about 25 degree to about 35 degree. The third chip deflector surface 30c and the third floor region 28c form a third groove 36c of the chip control structure 12.

It will be appreciated that, although only three grooves 36a, 36b and 36c are shown in the present invention, most any number of grooves may be formed in the upper face 14 of the insert 10 as long as the depth of the grooves of the chip control structure 12 generally decreases from the land 26 to the center of the insert. As shown in FIG. 4, it will be appreciated that the depths of the three groove embodiment of the invention, namely 36a, 36b and 36c, have been specifically selected to control chip formation over three ranges of materials cutting depths and feed rates. More particularly, groove 36a is of a depth suited for low depth of cut and feed rates, groove 36b is of a depth suited for medium depth of cut and feed rates and groove 36c is of a depth suited for heavy depths of cut and higher feed rates. Groove 36a is the deepest to provide sufficient control of the formation of the chip at low depth of cut and feed rates, groove 36b is less deep to prevent cratering of the insert at medium depths of cuts and feed rates and groove 36c is the shallowest at heavy depth of cut and feed rates in view of the fact that the chip is typically large enough such that a shallow groove is sufficient for chip formation. Typically, by way of example, low feed rates range between about 0.002–0.006 IPR (inches per revolution) and depth of cut between about 0.005–0.025 in., medium feed rates range between about 0.006–0.012 IPR (inches per revolution) and depth of cut between about 0.025–0.075 in., and high feed rates range between about 0.012–0.020 IPR (inches per revolution) and depth of cut between about 0.075–0.250 in.

The distance from the cutting edge 22 to groove 36a may vary as a function of the insert IC size. The IC size is defined as the diameter of the largest inscribed circle that may fit within the perimeter of the insert. The larger the IC size, the greater distance that groove 36a may be from the cutting edge 22. Similarly, the distance of groove 36b from groove 36a is selected as a function of the distance of groove 36a from the cutting edge 22. In a preferred embodiment, the distance from the groove 36a to groove 36b may vary between 45–55 percent more than the distance from the cutting edge 22 to groove 36a. Correspondingly, the distance of groove 36c from groove 36a may vary between 95–105 percent more than the distance from the cutting edge 22 to groove 36a.

While the invention has been specifically described in connection with certain specific embodiments thereof, it is to be understood that this is by way of illustration and not of limitation, and the scope of the appended claims should be construed as broadly as the prior art will permit.

What is claimed is:

1. A cutting insert having an upper and a lower base face; side walls adjoining the faces; at least one cutting edge formed at an intersection of the upper face and a side wall; at least one cutting corner formed at an intersection of an adjacent pair of side walls; a chip control structure formed in the upper face extending along the cutting edge from the cutting corner for at least an effective cutting length of the cutting edge; a land surface spacing the chip control structure from the cutting edge; the chip control structure comprising multiple radially spaced grooves, wherein the grooves of the chip control structure have a depth generally decreasing from the land to the center of the insert.

2. The cutting insert of claim 1 wherein each groove includes a floor region and a chip deflector surface.

3. The cutting insert of claim 2 wherein the cutting insert is of a triangular shape and wherein a cutting edge is formed at the intersection of the upper face and each side wall.

4. The cutting insert of claim 2 wherein the cutting insert is of a rhombic shape and wherein a cutting edge is formed at the intersection of the upper face and each side wall.

5. The cutting insert of claim 2 wherein the cutting insert is of a rectangular shape and wherein a cutting edge is formed at the intersection of the upper face and each side wall.

6. The cutting insert of claim 2 wherein the cutting insert is of a diamond shape and wherein a cutting edge is formed at the intersection of the upper face and each side wall.

7. The cutting insert of claim 1 wherein the chip control structure comprises:

a first descending surface extending from the inner edge of the land surface downwardly toward the base face and inwardly toward the center of the insert to a first floor region, a first chip deflector surface ascending upwardly from the first floor region ascends toward the upper face and inwardly toward the center of the insert to a first island, a second descending surface extending downwardly from the first island toward the base face and inwardly toward the center of the insert to a second floor region, a second chip deflector surface extending upwardly from the second floor region toward the upper face and inwardly toward the center of the insert to a third floor region;

a third chip deflector surface extending upwardly from the third floor region toward the upper face and inwardly toward the center of the insert.

8. The chip control structure of claim 7 wherein the first island is a generally horizontal surface and is at a depth lower than the depth of the land surface.

9. The chip control structure of claim 7 wherein the first floor region and the first chip deflector cooperatively define a first groove of the chip control structure.

10. The chip control structure of claim 7 wherein the second floor region is a generally horizontally extending surface.

11. The chip control structure of claim 7 wherein the depth of the first floor region is greater than the depth of the second floor region.

12. The chip control structure of claim 7 wherein the second chip deflector surface and the second floor region cooperatively define a second groove of the chip control structure.

13. The chip control structure of claim 7 wherein the third floor region is a generally horizontally extending surface and is generally of the same depth as the first island.

14. The chip control structure of claim 7 wherein the third chip deflector surface and the third floor region form a third groove of the chip control structure.

15. A cutting insert having an upper and a lower base face; side walls adjoining the faces; at least one cutting edge formed at an intersection of the upper face and a side wall; at least one corner formed at an intersection of an adjacent pair of side walls; a chip control structure formed in the upper face extending along the cutting edge from the corner; a land surface spacing the chip control structure from the cutting edge; the chip control structure comprising:

a first descending surface extending from the inner edge of the land surface downwardly toward the base face and inwardly toward the center of the insert to a first floor region, a first chip deflector surface ascending upwardly from the first floor region ascends toward the upper face and inwardly toward the center of the insert to a first island, a second descending surface extending downwardly from the first island toward the base face and inwardly toward the center of the insert to a second floor region, a second chip deflector surface extending upwardly from the second floor region toward the upper face and inwardly toward the center of the insert to a third floor region;

a third chip deflector surface extending upwardly from the third floor region toward the upper face and inwardly toward the center of the insert.

16. The chip control structure of claim 15 wherein the first floor region and the first chip deflector cooperatively define a first groove of the chip control structure.

17. The chip control structure of claim 16 wherein the second chip deflector surface and the second floor region cooperatively define a second groove of the chip control structure.

18. The chip control structure of claim 17 wherein the third chip deflector surface and the third floor region form a third groove of the chip control structure.

19. The chip control structure of claim 18 wherein the first groove, the second groove and the third groove are radially spaced.

20. The chip control structure of claim 19 wherein the first groove is deeper than the second groove and the second groove is deeper then the third groove.

* * * * *